(12) United States Patent
Zou et al.

(10) Patent No.: US 10,909,252 B2
(45) Date of Patent: Feb. 2, 2021

(54) BLOCKCHAIN-BASED RELATIONSHIP BINDING METHOD, APPARATUS, AND DEVICE

(71) Applicant: ADVANCED NEW TECHNOLOGIES CO., LTD., Grand Cayman (KY)

(72) Inventors: Xueqing Zou, Hangzhou (CN); Siyu Xia, Hangzhou (CN); Lei Cao, Hangzhou (CN); Jincheng Wang, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/877,337

(22) Filed: May 18, 2020

(65) Prior Publication Data
US 2020/0327240 A1    Oct. 15, 2020

Related U.S. Application Data

(63) Continuation of application No. PCT/CN2020/071592, filed on Jan. 11, 2020.

(30) Foreign Application Priority Data

Jun. 11, 2019    (CN) .......................... 2019 1 0502763

(51) Int. Cl.
*G06F 21/62* (2013.01)
*H04L 9/06* (2006.01)
(Continued)

(52) U.S. Cl.
CPC ........ *G06F 21/602* (2013.01); *G06F 16/2282* (2019.01); *G06F 16/27* (2019.01);
(Continued)

(58) Field of Classification Search
CPC ........ G06F 21/60; G06F 16/27; G06F 16/284; G06F 16/2282; H04L 9/0637
See application file for complete search history.

(56) References Cited

U.S. PATENT DOCUMENTS

| 6,571,339 B1 | 5/2003 | Danneels et al. |
| 7,403,922 B1 | 7/2008 | Lewis et al. |

(Continued)

FOREIGN PATENT DOCUMENTS

| CN | 106453415 A | 2/2017 |
| CN | 107451485 A | 12/2017 |

(Continued)

OTHER PUBLICATIONS

First Search for Chinese Application No. 201910502763.9 dated May 14, 2020.
(Continued)

*Primary Examiner* — Noura Zoubair

(57) ABSTRACT

One or more embodiments of the specification provide a blockchain-based relationship binding method, apparatus, and device. An exemplary method may include: receiving a user binding request including a binding tag, the binding tag includes (1) a binding type of a binding relationship, and (2) role information of the second user in the binding relationship; sending a confirmation request to a second user; retrieving a relationship table of the second user; in response to the binding type in the user binding request includes a one-to-one binding relationship: determining whether the one or more binding types in the relationship table of the second user include the binding type in the user binding request, and if yes, terminating the method; and generating a record of binding relationship; writing the record of binding relationship into a blockchain; and updating the relationship table in the local database.

15 Claims, 5 Drawing Sheets

(51) Int. Cl.
*H04L 9/32* (2006.01)
*G06F 21/60* (2013.01)
*G06F 16/27* (2019.01)
*G06F 16/22* (2019.01)
*G06F 16/28* (2019.01)

(52) U.S. Cl.
CPC .......... *G06F 16/284* (2019.01); *H04L 9/0637* (2013.01); *H04L 2209/38* (2013.01)

(56) References Cited

U.S. PATENT DOCUMENTS

| | | |
|---|---|---|
| 9,635,000 B1 | 4/2017 | Muftic |
| 2010/0287213 A1* | 11/2010 | Rolls .................. G16H 10/60 707/803 |
| 2011/0167059 A1* | 7/2011 | Fallah .................. G06Q 30/08 707/723 |
| 2011/0251951 A1 | 10/2011 | Kolkowitz et al. |
| 2012/0284175 A1 | 11/2012 | Wilson et al. |
| 2013/0024364 A1 | 1/2013 | Shrivastava et al. |
| 2015/0310424 A1 | 10/2015 | Myers |
| 2016/0292396 A1 | 10/2016 | Akerwall |
| 2017/0103472 A1 | 4/2017 | Shah |
| 2017/0132630 A1 | 5/2017 | Castinado et al. |
| 2017/0132636 A1 | 5/2017 | Caldera |
| 2017/0163733 A1 | 6/2017 | Grefen et al. |
| 2017/0236094 A1 | 8/2017 | Shah |
| 2017/0287090 A1 | 10/2017 | Hunn et al. |
| 2017/0366348 A1 | 12/2017 | Weimer et al. |
| 2018/0078843 A1* | 3/2018 | Tran .................. A61B 5/0024 |
| 2019/0095585 A1 | 3/2019 | Jawaharlal et al. |
| 2019/0349372 A1* | 11/2019 | Smith .................. H04L 63/0823 |

FOREIGN PATENT DOCUMENTS

| | | |
|---|---|---|
| CN | 107563846 A | 1/2018 |
| CN | 109145201 A | 1/2019 |
| CN | 109302415 A | 2/2019 |
| CN | 109660352 A | 4/2019 |
| CN | 110334160 A | 10/2019 |
| WO | 2018140913 A1 | 8/2018 |

OTHER PUBLICATIONS

First Office Action for Chinese Application No. 201910502763.9 dated May 22, 2020.
Second Office Action for Chinese Application No. 201910502763.9 dated Jun. 28, 2020.
Written Opinion and International Search Report for PCT Application No. PCT/CN2020/071592 made available to public dated Dec. 17, 2020.

* cited by examiner

BLOCKCHAIN-BASED RELATIONSHIP BINDING METHOD, APPARATUS, AND DEVICE

CROSS REFERENCE TO RELATED APPLICATIONS

The application is a continuation application of International Patent Application No. PCT/CN2020/071592, filed on Jan. 11, 2020, which claims priority to Chinese Patent Application No. 201910502763.9, filed on Jun. 11, 2019. The entire content of the above referenced applications are incorporated herein by reference.

TECHNICAL FIELD

The present application relates to the technical field of blockchains, and in particular, to a blockchain-based relationship binding method, apparatus, and device.

BACKGROUND

Various relationships exist among people in life, such as blood relationships, legal relationships, cooperation relationships, employment relationships, etc. In some situations, some problems may be solved according to existing relationships. For example, a patient may be rescued according to a blood relationship, a person's identity may be determined according to a legal relationship, etc.

Current inter-person relationships are mostly determined by staff of relevant agencies and maintained by centralized identity management systems. However, human involvement in authentication inevitably has a risk of mis-operation, and a centralized database has problems such as data loss, data fraud, data island, etc., which may lead to more complicated situations such as bigamy, impossibility to determine a blood relationship, and the like.

SUMMARY

The objective of one or more embodiments of the specification is to provide a blockchain-based relationship binding method, apparatus, and device. Based on a smart contract in the blockchain, there is no human interference in a relationship binding process, and moreover, the relationship binding process is visible to multiple parties based on the characteristics of the blockchain technology, which ensures authenticity and validity of the relationship binding. In addition, a relationship binding record is written into the blockchain, which ensures the immutability, openness, and searchability of the relationship binding record, and effectively avoids problems such as data loss, data fraud, data island, etc.

To solve the above-described technical problems, one or more embodiments of the specification are implemented as follows.

One or more embodiments of the specification provide a blockchain-based relationship binding method, comprising: receiving a user binding request from a computing device of a first user, wherein the user binding request comprises user information of the first user, user information of a second user to be bound with the first user, and a binding tag, the binding tag comprising (1) a binding type of a binding relationship, and (2) role information of the second user in the binding relationship; retrieving information of a user terminal of the second user based on a mapping between the user information of the second user and the user terminal; sending, through a smart contract, a binding relationship confirmation request to the user terminal of the second user based on the information of the user terminal, the binding relationship confirmation request comprising the user information of the first user and the binding tag; in response to receiving a confirming response from the second user, retrieving a relationship table of the second user from a local database, wherein the relationship table of the second user comprises a primary dimension comprising the user information of the second user, a secondary dimension comprising user information of one or more users that have been bounded with the second user, a tertiary dimension comprising one or more binding types of one or more historical binding relationships between the second user and the one or more users, and a quaternary dimension comprising the role information of the second user in the one or more historical binding relationships; determining, through the smart contract, attribute information of the binding type in the user binding request, wherein the smart contract stores a mapping relationship between the attribute information and the binding type; in response to the attribute information indicating that the binding type in the user binding request comprises a one-to-one binding relationship: determining whether the one or more binding types in the relationship table of the second user comprise the binding type in the user binding request, and if yes, terminating the method; in response to (1) the attribute information indicating that the binding type in the user binding request comprises a one-to-many binding relationship with a "one" aspect and a "many" aspect, and (2) the role information of the second user in the binding relationship corresponds to the "many" aspect of the one-to-many binding relationship: determining whether the relationship table of the second user comprises a record with (1) the binding type of the user binding request in the tertiary dimension, and (2) the role information of the user binding request in the quaternary dimension; and if yes, terminating the method; generating a record of binding relationship between the first user and the second user comprising user information of the first user, the user information of the second user, and the binding tag; writing the record of binding relationship into the blockchain; and updating the relationship table of the second user in the local database according to the user binding request.

In some embodiments, the record of binding relationship further comprises a timestamp of a current time.

In some embodiments, the operations further comprise: determining whether a response from the second user to the confirmation request is received within a preset time window; and if not, sending binding failure information to the first user.

In some embodiments, the updating the relationship table of the second user in the local database according to the user binding request comprises: adding the user information of the first user to the secondary dimension of the relationship table, the binding type to the tertiary dimension.

In some embodiments, the operations further comprise: updating a relationship table of the first user in the local database according to the user binding request by adding the user information of the second user to the secondary dimension of the relationship table, the binding type to the tertiary dimension, and the role information to the quaternary dimension.

In some embodiments, the generating a record of binding relationship between the first user and the second user according to the user information comprises: generating a record of binding relationship by associating the user information of the first user, the user information of the second user, and the binding tag.

In some embodiments, the writing the record of binding relationship into the blockchain comprises: encrypting the record of binding relationship into a cipher text; and writing the ciphertext to the blockchain.

One or more embodiments of the specification provide a blockchain-based relationship binding device, comprising: a processor, and a memory configured to store a computer executable instruction, wherein the computer executable instruction, when being executed, causes the processor to implement steps of the above-described blockchain-based relationship binding method.

One or more embodiments of the specification provide a storage medium configured to store a computer executable instruction, wherein the computer executable instruction, when being executed, implements steps of the above-described blockchain-based relationship binding method.

With the blockchain-based relationship binding method, apparatus, and device in one or more embodiments of the specification, when a user binding request sent by a first user is received, a smart contract in a blockchain is invoked, wherein the user binding request comprises user information of a second user to be bound with the first user and a binding tag of a to-be-bound relationship between the first user and the second user. Based on the smart contract, the first user and the second user are bound in a relationship corresponding to the binding tag. When the binding is successful, a record of binding relationship between the first user and the second user is generated according to the user information of the second user, and the record of binding relationship is written into the blockchain. Therefore, based on the smart contract in the blockchain, there is no human interference in the relationship binding process, and moreover, the relationship binding process is visible to multiple parties based on the characteristics of the blockchain technology, which ensures authenticity and validity of the bound relationship. In addition, the immutability, openness, and searchability of the data on the chain are ensured, which effectively avoids problems such as data loss, data fraud, data island, etc.

BRIEF DESCRIPTION OF THE DRAWINGS

To more clearly describe the technical solutions of one or more embodiments of the specification or of the current technologies, the accompanying drawings to be used in the description of the embodiments or the current technologies will be briefly described below. Apparently, the accompanying drawings in the description below are merely some of the embodiments of the specification. Other drawings may be obtained by one of ordinary skill in the art without creative effort according to these accompanying drawings.

DETAILED DESCRIPTION

To enable those skilled in the art to better understand the technical solutions of one or more embodiments of the specification, the technical solutions of one or more embodiments of the specification will be completely and thoroughly described below with reference to the accompanying drawings in one or more embodiments of the specification. Apparently, the described embodiments are merely some, but not all, embodiments of the specification. All other embodiments obtained, based on one or more embodiments of the specification, by one of ordinary skill in the art without creative effort shall fall within the protection scope of the present application.

One or more embodiments of the specification provide a blockchain-based relationship binding method, apparatus, and device, which achieve relationship binding between different users based on a smart contract in a blockchain. There is no human interference in the relationship binding process, and moreover, the relationship binding process is visible to multiple parties, which ensures authenticity and validity of the bound relationship. In addition, a relationship binding record is stored to the blockchain, which ensures the immutability, openness, and searchability of the data on the chain, and effectively avoids problems such as data loss, data fraud, data island, etc. Here, the relationship binding method may be applied to a private chain, a public chain, or a consortium chain.

For ease of differentiation, in the present application, a party requesting relationship binding is referred to as a first user, and the first user operates a first client; a user to be bound with the first user is referred to as a second user, and the second user operates a second user terminal; wherein the first client and the second user terminal may be a cell phone, a tablet computer, a desktop computer, a portable laptop computer, and the like. It should be understood that, in various relationship binding scenarios, the first user may also be the second user, and the second user may also be the first user. Correspondingly, the first client may also be the second user terminal, and the second user terminal may also be the first client.

Figure 1:
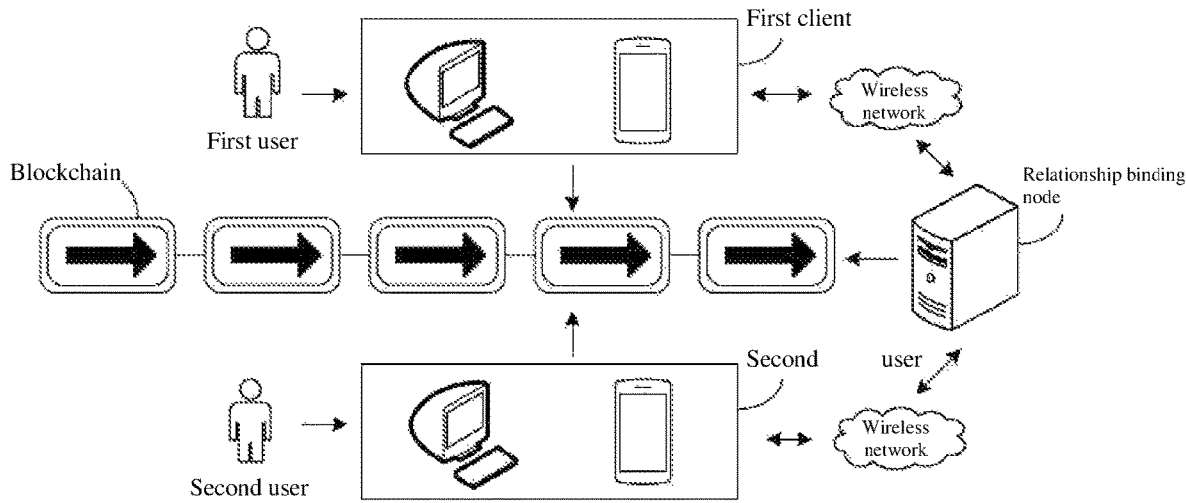
FIG. 1 is a schematic diagram of a scenario of a blockchain-based relationship binding system according to one or more embodiments of the specification.

FIG. 1 is a schematic diagram of a scenario of a blockchain-based relationship binding system according to one or more embodiments of the specification. As shown in FIG. 1, the system comprises: a first client, a second user terminal, and a relationship binding node, wherein a first user operates the first client, a second user operates the second user terminal, the first client and the second user terminal are both in communication connection with the relationship binding node via a wireless network, and the first client, the second user terminal, and the relationship binding node are all connected into a blockchain. A blockchain-based relationship binding process comprises:

(1) in response to a relationship binding event triggered by the first user, the first client generates a user binding request, and sends the generated user binding request to the relationship binding node, so as to request to bind a relationship between the first user and the second user, wherein the user binding request comprises user information of the second user to be bound with the first user and a binding tag of a to-be-bound relationship between the first user and the second user. In the embodiments of the specification, the user information is used to identify a unique user. For example, the user information is blockchain account information, user's ID number, and the like. The relationship tag includes a binding type of the to-be-bound relationship and role information of the to-be-bound user in the to-be-bound relationship, and the format of the binding tag may be set on one's own as needed in practical applications. As an example, the format of the binding tag may be "binding type: role information of a first user-role information of a second user." For example, a binding tag of "biological father and daughter: biological father-daughter" indicates that the first user requests to bind with the second user in a biological father and daughter relationship, wherein the role information of the first user in the biological father and daughter relationship is biological father, and the role information of the second user in the biological father and daughter relationship is daughter. Furthermore, the relationship in the embodiments of the specification comprises a husband and wife relationship, a blood relationship, a friend relationship, a corporation relationship, an employment relationship, and the like between users;

(2) the relationship binding node receives the user binding request sent by the first client, obtains the user information of the first user, invokes a smart contract in the blockchain, first determines, based on the smart contract, that the user information of the second user included in the user binding request is valid, and then determines a type of the binding tag included in the user binding request. When the binding tag is a binding tag of a one-to-one binding relationship, if it is determined that the second user is not bound with any user in a relationship corresponding to the binding tag, then a binding relationship confirmation request is sent to the second user terminal. When the binding tag is a binding tag of a one-to-many binding relationship, if it is determined that the second user has a first identity in a relationship corresponding to the binding tag and it is determined that the second user is not bound with any user in the relationship corresponding to the binding tag, then a binding relationship confirmation request is sent to the second user terminal; but if it is determined that the second user has a second identity in the relationship corresponding to the binding tag, then a binding relationship confirmation request is sent to the second user terminal. When the binding tag is a binding tag of a many-to-many binding relationship, a binding relationship confirmation request is sent to the second user terminal. Here, the first and second identities may be different in different binding relationships. For example, in the biological father and daughter relationship, daughter is the first identity, and biological father is the second identity. For another example, in an employment relationship that an employee can be employed only by one employer, employee is the first identity, and employer is the second identity;

(3) the second user terminal receives the binding relationship confirmation request sent by the relationship binding node, displays prompt information, and when obtaining a confirmation message submitted by the second user, sends confirmation response data to the relationship binding node;

(4) if the relationship binding node obtains the confirmation response data sent by the second user terminal, the relationship binding node binds the first user and the second user in the relationship corresponding to the binding tag, and generates a record of binding relationship, wherein the record of binding relationship comprises the user information of the first user, the user information of the second user, and the binding tag. For example, the record of binding relationship comprises blockchain account information of the first user, blockchain account information of the second user, and the binding tag. The record of binding relationship may further comprise information such as relationship binding time; and (5) the relationship binding node writes the generated record of binding relationship into the blockchain for a user authorized to query to perform relationship query.

In the above-described relationship binding process, relationship binding between different users is achieved based on a smart contract in the blockchain. There is no human interference in the binding process, and moreover, the binding process is visible to multiple parties, which ensures authenticity and validity of the bound relationship. In addition, a relationship binding record is stored to the blockchain, which ensures the immutability, openness, and searchability of the data on the chain, and effectively avoids problems such as data loss, data fraud, data island, etc.

Figure 2:
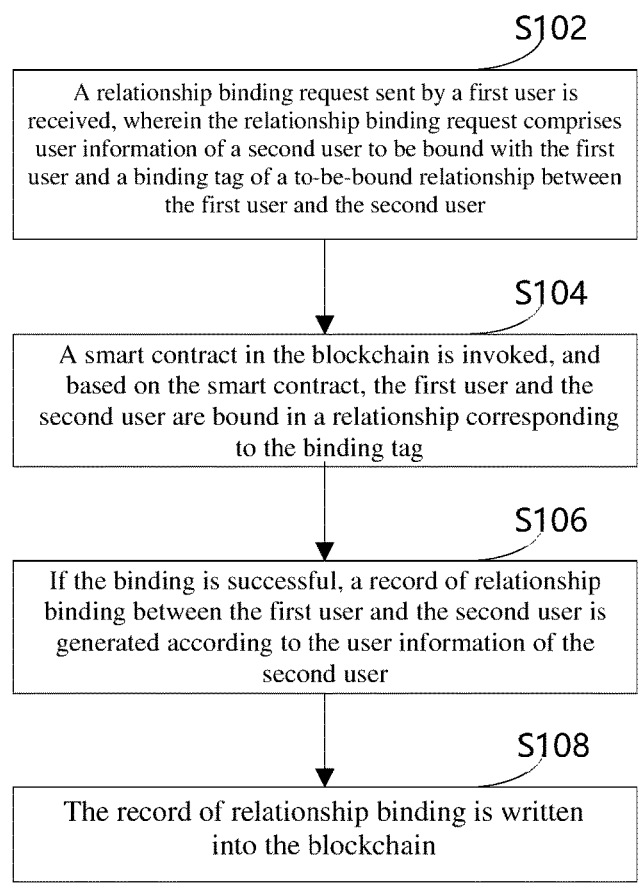
FIG. 2 is a first flow chart of the blockchain-based relationship binding method according to one or more embodiments of the specification.

FIG. 2 is a first flow chart of the blockchain-based relationship binding method according to one or more embodiments of the specification. The method in FIG. 2 may be implemented by the relationship binding node connected into the blockchain in FIG. 1. As shown in FIG. 2, the method comprises the following steps.

In Step S102, a user binding request sent from a computing device of a first user is received, wherein the user binding request comprises user information of a second user to be bound with the first user and a binding tag of a to-be-bound relationship between the first user and the second user. In some embodiments, the user binding request may also comprise user information of the first user. In some embodiments, the binding tag comprises a binding type of the to-be-bound relationship and role information of the second user in the to-be-bound relationship. Here, the role information refers to the second user's role in the to-be-bound relationship.

In one example, a user binding request sent by the first client as operated by the first user is received, and user information of the first user is obtained, wherein the user information is used to identify a unique user. For example, the user information is blockchain account information, user's ID number, and the like. The format of the binding tag may be "relationship type: role information of a first user-role information of a second user." For example, a binding tag of "biological father and daughter: biological father-daughter" indicates that the first user requests to bind with the second user in a biological father and daughter relationship, wherein the role information of the first user in the biological father and daughter relationship is biological father, and the role information of the second user in the biological father and daughter relationship is daughter. Furthermore, the relationship in the embodiments of the specification comprises a husband and wife relationship, a blood relationship, a friend relationship, a cooperation relationship, an employment relationship, and the like between users.

In Step S104, a smart contract in the blockchain is invoked, and based on the smart contract, the first user and the second user are bound in a relationship corresponding to the binding tag.

To ensure authenticity and validity of the bound relationship, the relationship binding node invokes the smart contract in the blockchain, first detects a binding condition based on the smart contract, and when a detection result is that the binding condition is met, binds the first user and the second user in the relationship corresponding to the binding tag.

In Step S106, if the binding is successful, a record of binding relationship between the first user and the second user is generated according to the user information of the second user.

Here, the record of binding relationship between the first user and the second user is generated according to the user information of the second user, comprising: associating and recording the user information of the first user, the user information of the second user, and the binding tag. The record may be stored as a record of binding relationship between the first user and the second user in the blockchain. For example, blockchain account information of the first user, blockchain account information of the second user, and the binding tag are associated and recorded, and may be used as the record of binding relationship between the first user and the second user. As a result, the record of binding relationship is generated according to the user information for uniquely identifying a user, which ensures the uniqueness between the users and the relationship and avoids the problem of confused relationships.

In some embodiments, the record of binding relationship may further comprise information such as a timestamp of the relationship binding time (i.e., current time), which may be set on one's own as needed in practical applications.

In Step S108, the record of binding relationship is written into the blockchain.

In one example, the relationship binding node uploads the generated record of binding relationship to the blockchain for storage, so that a user authorized to query may query a relationship between users in the blockchain. Since the record of binding relationship stored in the blockchain is stored through encryption in the cyphertext form, the user authorized to query may operate a client to obtain a decryption key and a Hash, search for a corresponding record of binding relationship in the cyphertext form in the blockchain according to the Hash, and use the decryption key to decrypt the found record of binding relationship in the cyphertext form to obtain the record of binding relationship in the plaintext form. Furthermore, since the blockchain technology has immutability and the record of binding relationship is written in the blockchain as witnessed by multiple parties, it can be ensured that the relationship binding result uploaded to the blockchain may not be tampered with, thereby ensuring the authenticity of the data.

In one or more embodiments of the specification, when a user binding request sent by a first user is received, a smart contract in a blockchain is invoked, wherein the user binding request comprises user information of a second user to be bound with the first user and a binding tag of a to-be-bound relationship between the first user and the second user. Based on the smart contract, the first user and the second user are bound in a relationship corresponding to the binding tag. When the binding is successful, a record of binding relationship between the first user and the second user is generated according to the user information of the second user, and the record of binding relationship is written into the blockchain. Therefore, in the embodiments of the specification, there is no human interference in the relationship binding process based on the smart contract in the blockchain, and moreover, the relationship binding process is visible to multiple parties based on the characteristics of the blockchain technology, which ensures authenticity and validity of the bound relationship. In addition, the immutability, openness, and searchability of the data on the chain are ensured, which effectively avoids problems such as data loss, data fraud, data island, etc.

Figure 3:
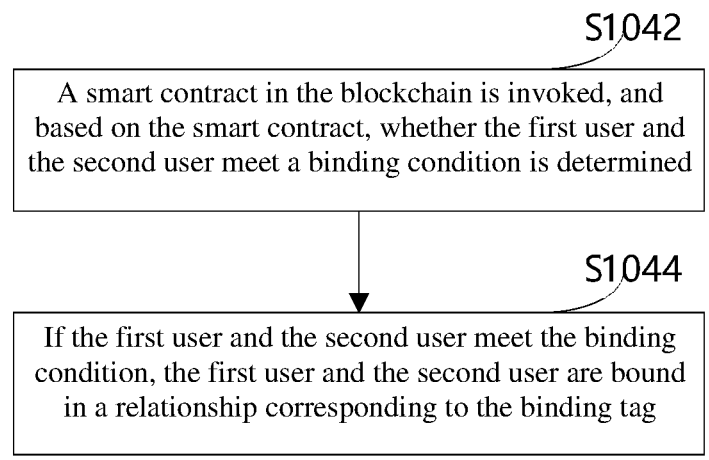
FIG. 3 is a first detailed diagram of Step 1042 according to one or more embodiments of the specification.

In one or more embodiments of the specification, to ensure authenticity and validity of the bound relationship, as shown in FIG. 3, Step S104 comprises the following steps.

In Step S1042, a smart contract in the blockchain is invoked, and based on the smart contract, whether the first user and the second user meet a binding condition is determined.

In Step S1044, if the first user and the second user meet the binding condition, the first user and the second user are bound in a relationship corresponding to the binding tag.

The user information of the second user included in the user binding request may be invalid user information or incorrect user information, such that the bound relationship is meaningless. In addition, if the second user is not aware that the first user and the second user are bound in a relationship, the relationship is false and there may be a risk that the interest of the second user is harmed. Therefore, in one or more embodiments of the specification, the determining whether the first user and the second user meet a binding condition in Step S1042 comprises: if it is determined, based on the smart contract, that the user information of the second user is valid, and confirmation response data sent by the second user is obtained, then determining that the first user and the second user meet the binding condition.

Correspondingly, the method further comprises: according to the binding tag and user information of the first user, sending a binding relationship confirmation request to the second user, and obtaining the confirmation response data sent by the second user. In some embodiments, a correspondence map between contact information and users may be stored in the smart contract. Here, the contact information may refer to a user terminal (a software or a hardware), such as a phone number, an email address, a computing device installed an application accessible by the blockchain node, or another form of terminal. For example, a binding relationship confirmation request is generated according to the binding tag and user information of the first user, a second user terminal corresponding to the user information of the second user is determined according to the pre-stored correspondence map, and the generated binding relationship confirmation request is sent to the determined second user terminal. When the second user terminal detects the binding relationship confirmation request, the second user terminal displays prompt information to prompt the second user to confirm whether to be bound with the first user in a relationship corresponding to the binding tag. Upon receiving a confirmation message submitted by the second user, the second user terminal sends confirmation response data to the relationship binding node. The relationship binding node receives the confirmation response data sent by the second user terminal.

In one or more embodiments of the specification, the binding request may further comprise message information. The message information may be preset message information, or may be information agreed on by the first user and the second user that serves as prompt information between the first user and the second user, or may be information edited by the first user on his/her own, such as a greeting, a good wish, and the like. Correspondingly, the method further comprises: according to the message information, the binding tag, and user information of the first user, sending a binding relationship confirmation request to the second user, and obtaining the confirmation response data sent by the second user. For example, a binding relationship confirmation request is generated according to the binding tag and user information of the first user, a second user terminal corresponding to the user information of the second user is determined according to pre-stored user information and correspondence relationship with clients, and the generated binding relationship confirmation request is sent to the determined second user terminal. When the second user terminal detects the binding relationship confirmation request, the second user terminal displays prompt information to prompt the second user to confirm whether to be bound with the first user in a relationship corresponding to the binding tag. Upon receiving a confirmation message submitted by the second user, the second user terminal sends confirmation response data to the relationship binding node. The relationship binding node receives the confirmation response data sent by the second user terminal.

In one or more embodiments of the specification, a binding relationship confirmation request comprising the binding tag and user information of the first user is sent to the second user, or a binding relationship confirmation request comprising the message information, the binding tag and user information of the first user is sent to the second user, and the confirmation response data sent by the second user terminal is obtained, thereby effectively avoiding a false relationship since the second user is not aware and preventing harms to the interest of the second user.

If the second user does not promptly confirm the binding with the first user in a relationship corresponding to the binding tag, the relationship binding node may be caused to be in a waiting state for a long time. Therefore, the above-described obtaining the confirmation response data sent by the second user terminal comprises: determining whether the confirmation response data sent by the second user terminal is obtained within a preset time window; if yes, proceeding to a subsequent operation; if no, sending binding failure information to the first user.

Since each relationship in real life corresponds to users with different identities and different numbers of users, bound relationships in the embodiments of the specification are divided into one-to-one binding relationships, one-to-many binding relationships, and many-to-many binding relationships, which are used as an attribute of a relationship. For example, the husband and wife relationship is a one-to-one binding relationship, the biological father and daughter relationship is a one-to-many binding relationship, and the teacher and student relationship is a many-to-many binding relationship. In the following description, "a binding type" and a "relationship" may be used interchangeably, and the "attribute information" of a binding type may indicate the attribute of the binding type/relationship. The mapping between attribute information and binding types may be stored on the blockchain (e.g., in a smart contract) or in a local database.

Furthermore, when the binding tag included in a binding request is a one-to-one binding relationship, the determining whether the first user and the second user meet a binding condition in Step S1042 further comprises: if it is determined, based on the smart contract, that the second user is not bound with any user in a relationship corresponding to the binding tag, then determining that the first user and the second user meet the binding condition;

when the binding tag included in a binding request is a one-to-many binding relationship, the determining whether the first user and the second user meet a binding condition in Step S1042 further comprises: if it is determined, based on the smart contract, that the second user has a first identity in a relationship corresponding to the binding tag and it is determined that the second user is not bound with any user in the relationship corresponding to the binding tag, then determining that the first user and the second user meet the binding condition. Here, the first identity may be different in different relationships. For example, in a biological father and daughter relationship, one biological father may have multiple daughters, but each daughter may only have one biological father. Daughter is the first identity, and biological father is the second identity.

In the embodiments of the specification, whether the first user and the second user meet a binding condition is determined in different manners for relationships having different attributes, which avoids problems such as unreasonably bound relationships, relationship conflicts, and the like.

Furthermore, when determining whether the first user and the second user meet a binding condition, the method further comprises: sending binding failure information to the first user.

Figure 4:
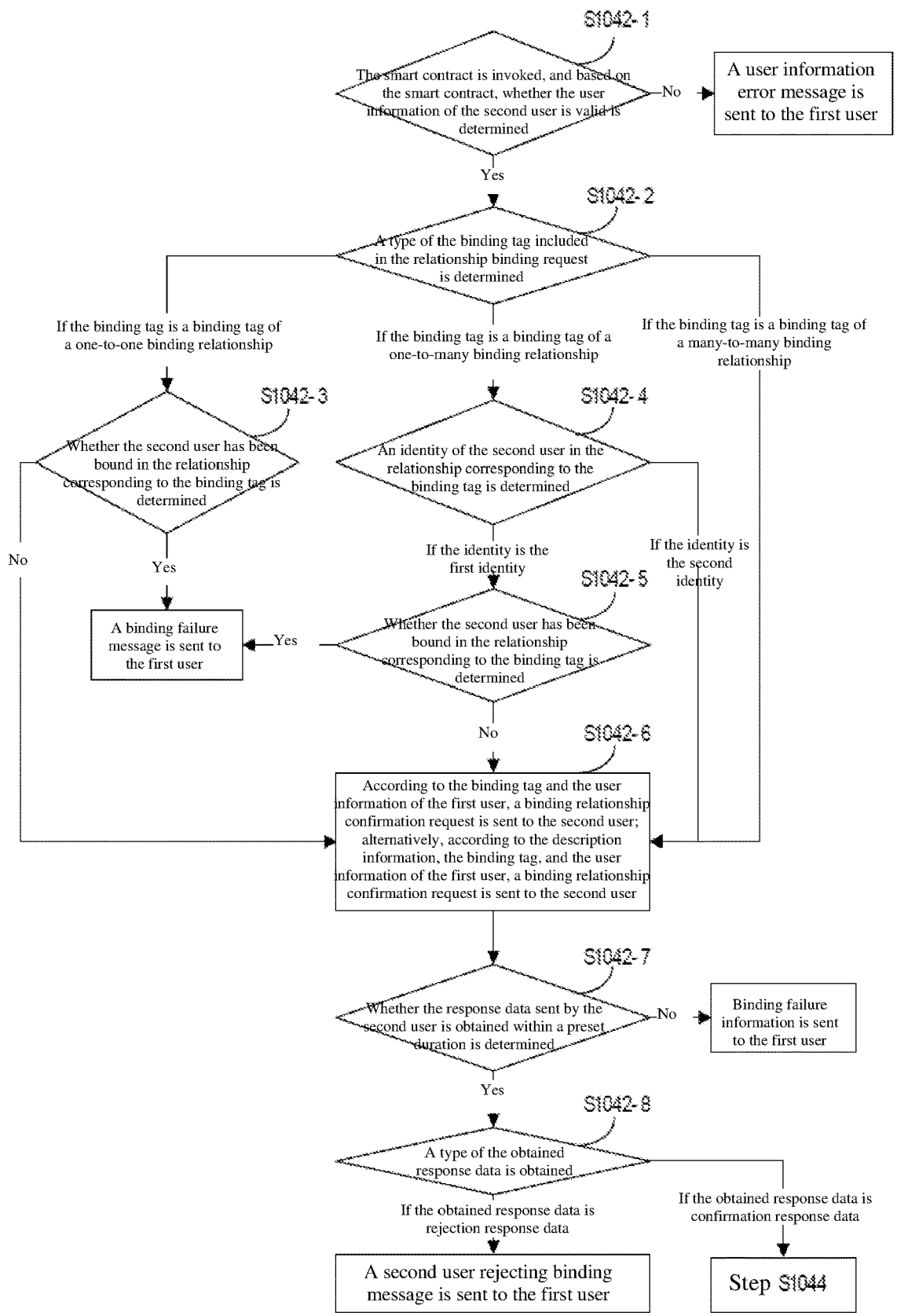
FIG. 4 is a second detailed diagram of Step 1042 according to one or more embodiments of the specification.

In an exemplary embodiment, as shown in FIG. 4, Step S1042 may comprise the following steps.

In Step S1042-1, the smart contract is invoked, and based on the smart contract, whether the user information of the second user is valid is determined; if yes, Step S1042-2 is executed; otherwise, a user information error message is sent to the first user.

In one example, whether pre-stored user information contains the user information included in the user binding request is determined. If a determining result is yes, then the user information included in the binding request is determined to be valid. If the determining result is no, then the user information included in the binding request is determined to be invalid.

In Step S1042-2, a type of the binding tag included in the user binding request is determined. If the binding type in the binding question is a one-to-one binding relationship, Step S1042-3 is executed. If the binding tag is a binding tag of a one-to-many binding relationship, Step S1042-4 is executed. If the binding tag is a binding tag of a many-to-many binding relationship, Step S1042-6 is executed.

In one example, the smart contract includes a correspondence relationship between a binding tag and a relationship and a correspondence relationship between each relationship and a relationship attribute. A relationship corresponding to the binding tag included in the user binding request is determined according to the correspondence relationship between the binding tag and the relationship, a relationship attribute of the relationship corresponding to the binding tag included in the user binding request is determined according to the correspondence relationship between each relationship and the relationship attribute, and a type of the binding tag is determined according to the relationship attribute. Alternatively, the smart contract includes a determination standard for types of binding tags, and a type of the binding tag included in the binding request is determined according to the determination standard.

In Step S1042-3, whether the second user has been bound in the relationship corresponding to the binding tag is determined. If yes, a binding failure message is sent to the first user; otherwise, Step S1042-6 is executed.

In the embodiments of the specification, a local database of the relationship binding node stores bound relationships, such as a relationship table for each user. The relationship table may comprise at least four dimensions, where the primary dimension and a secondary dimension are user dimensions storing user information, the tertiary dimension comprises binding types and the quaternary dimension comprises role information. In particular, the primary dimension corresponds to a primary user, and is mapped to one or more bounded users in the secondary dimension who have bound with the first user. Each of the bounded users in the secondary dimension is mapped to one entry in the tertiary dimension and one entry in the quaternary dimension, the entry in the tertiary dimension corresponding to a binding type of a historical binding relationship between the primary user and the bounded user, and the entry in the quaternary dimension corresponding to the identify information of the primary user in the binding relationship with the bounded user. In some embodiments, all users' relationships are stored in one global relationship table. In other embodiments, each user's relationships are stored in an individual relationship table, which is indexed on the each user's user information (e.g., blockchain account ID, account number, personal ID, or another suitable identifier).

Correspondingly, Step S1042-3 comprises: searching for a relationship table of the second user in the local database according to the user information of the second user, determining whether the relationship table of the second user includes a relationship corresponding to the binding tag included in the binding request. In some embodiments, the relationship table of the second user from the local data comprises the primary dimension comprising the user information of the second user, the secondary dimension comprising user information of one or more users that have been bounded with the second user, the tertiary dimension comprising one or more binding types of one or more historical binding relationships between the second user and the one or more users, and the quaternary dimension comprising the role information of the second user in the one or more historical binding relationships. In some embodiments, one or more data entries in the tertiary dimension of the second user's relationship table are searched, and determined whether the binding type of the user binding request is in the tertiary dimension of a record in the second user's relationship table. If yes, determining that the second user has been bound in the relationship in the binding tag; if no, determining that the second user is not bound in the relationship in the binding tag.

Here, one example of the relationship table is shown below. The relationship table comprises four dimensions: the first dimension is "user information," the second dimension is "user information of users that have been bound," the third dimension is the "binding type," and the fourth dimension is the "identify information."

| User information | User information of users that have been bound | Binding type | Role information |
| --- | --- | --- | --- |
| USRE1 | USRE13 | Biological father and daughter relationship | Biological father |
|  | USRE26 | House buyer-seller relationship | Buyer |

For example, the user information of the first user is USER6, the binding tag included in the binding request comprises "husband and wife: wife-husband" (i.e., the binding type), the user information of the second user is USRE1, and the attribute information of the binding type is determined to be a one-to-one binding relationship, then the above-described relationship table is found according to the user information of the second user USRE1, and this relationship table does not include a husband and wife relationship. Then, Step S1042-6 is executed.

It should be noted that the relationship table is not limited to the above-described format, which may be set on one's own as needed in practical applications.

In Step S1042-4, an role information of the second user in the one-to-many relationship corresponding to the binding tag is determined. The one-to-many relationship comprises a "one" aspect and a "many" aspect. For example, one biological father may have many daughters, the biological father corresponds to the "one" aspect of the one-to-many relationship, and the daughter corresponds to the "many" aspect of the one-to-many relationship. If the role information of the second user corresponds to the "many" aspect of the one-to-many relationship, Step S1042-5 is executed. Otherwise, Step S1042-6 is executed.

In one example, the role of the second user in the relationship corresponding to the binding tag is determined according to the role information included in the binding tag. For example, according to the binding tag of "biological father and daughter: biological father-daughter," the role information of the second user may be determined to be daughter.

In Step S1042-5, whether the second user has been bound in the relationship corresponding to the binding type in the binding request is determined. For example, the process may include: whether the relationship table of the second user comprises a record with (1) the binding type of the user binding request in the tertiary dimension, and (2) the role information of the user binding request in the quaternary dimension. If yes, a binding failure message is sent to the first user; otherwise, Step S1042-6 is executed. Taking the above biological father and daughter relationship as an example, the biological father (i.e., the first user) sends a user binding request comprising the daughter's user information, and a binding tag comprising a binding type of the biological father-daughter relationship, role information of the biological father (i.e., father), and role information of the daughter (i.e., daughter). In some embodiments, the role information of the first user may be omitted. Since this relationship is a one-to-many relationship, and the role information of the daughter corresponds to the "many" aspect of the one-to-many relationship, the daughter's relationship table may be searched to determine whether the daughter has been bound in such a relationship. If the daughter's relationship table comprises a record with (1) the binding type of the user binding request in the tertiary dimension (e.g., whether the record has a biological father-daughter relationship in its tertiary dimension), and (2) the role information of the user binding request in the quaternary dimension (e.g., whether the daughter has been a daughter in the existing biological father-daughter relationship). If yes, a binding failure message is sent to the first user, i.e., the biological father.

The implementation method of this step is the same as the implementation method of Step S1042-3, which will not be repeated here.

In Step S1042-6, according to the binding tag and the user information of the first user, a binding relationship confirmation request is sent to the second user; alternatively, according to the description information, the binding tag, and the user information of the first user, a binding relationship confirmation request is sent to the second user.

In Step S1042-7, whether the response data sent by the second user is obtained within a preset duration is determined; if yes, Step S1042-8 is executed; otherwise, binding failure information is sent to the first user.

Here, the preset duration may be set on one's own as needed in practical applications, such as 2 minutes.

In Step S1042-8, a type of the obtained response data is obtained; if the obtained response data is confirmation response data, Step S1044 is executed; if the obtained response data is rejection response data, a second user rejecting binding message is sent to the first user.

Therefore, by determining validity of the user information of the second user, whether the second user may be bound in the relationship corresponding to the binding tag, and whether the second user confirms the relationship corresponding to the binding tag, the validity and accuracy of the bound relationship are ensured, which avoids relationship conflicts and unnecessary troubles caused by relationship conflicts.

Figure 5:
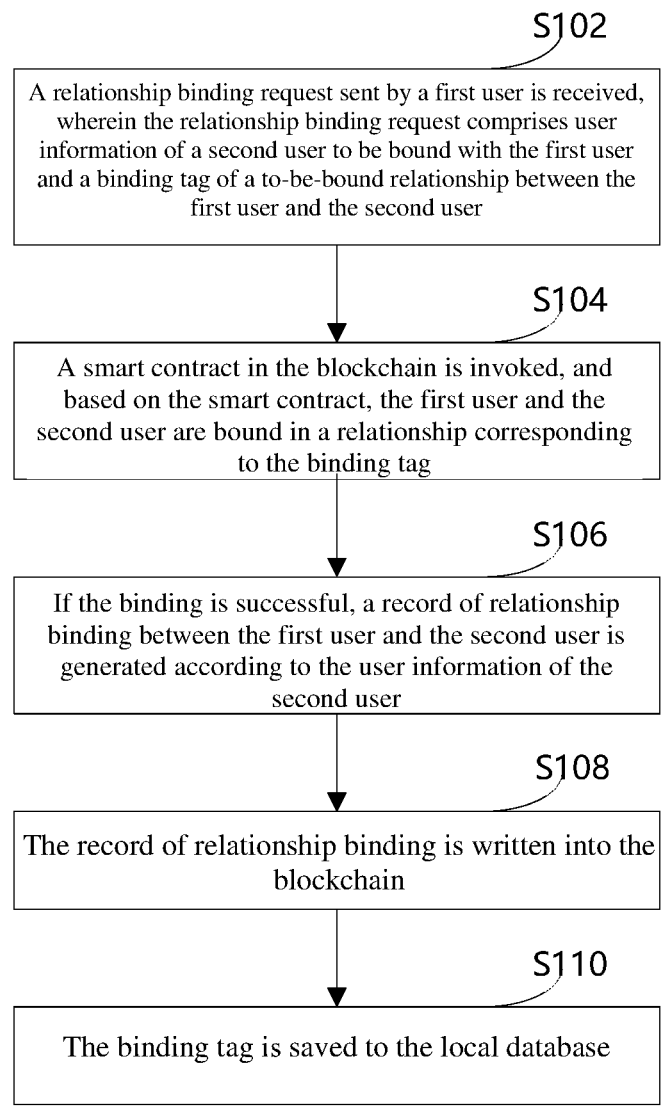
FIG. 5 is a second flow chart of the blockchain-based relationship binding method according to one or more embodiments of the specification.

Furthermore, to make information of relationships stored in the local database of the relationship binding node to be timely, FIG. 5 is a flow chart of a blockchain-based relationship binding method according to another embodiment of the specification. As shown in FIG. 5, this method further comprises, on the foundation of FIG. 2, the following step.

In Step S110: the local database is updated according to the user binding request. In some embodiments, the relationship tables of the users involved in the user binding request are both updated.

In one example, a relationship table of the first user is searched for in the local database according to the user information of the first user, the binding tag in the user binding request is saved to the relationship table of the first user. Subsequently or simultaneously, the relationship table of the second user is searched for in the local database according to the user information of the second user, and the binding tag in the user binding request is saved to the relationship table of the second user. After the relationship tables are updated, the relationship between the first user and the second user is correspondingly recorded locally. It should be noted that other information may also be stored in the relationship table according to various formats of relationship tables, such as storing user information of bound users, role information of users in bound relationships, etc. Therefore, after each relationship binding is successful, a corresponding binding tag is stored in a corresponding relationship table, which ensures prompt updates of relationships in the relationship table and makes the relationships to be timely. As an example, the above-described relationship table of the second user after the update is shown below.

| User information | User information of users that have been bound | Binding type | Role information |
|---|---|---|---|
| USRE1 | USRE13 | Biological father and daughter relationship | Biological father |
| | USRE26 | House buyer-seller relationship | Buyer |
| | USRE6 | Husband and wife relationship | Husband |

It should be noted that Step 110, Step 106, and Step 108 may be switched in the execution order, Step 110 may also be executed simultaneously with Step 106, or Step 110 may also be executed simultaneously with Step 108.

Therefore, when a user binding request sent by a first user is received, a smart contract in a blockchain is invoked, wherein the user binding request comprises user information of a second user to be bound with the first user and a binding tag of a to-be-bound relationship between the first user and the second user. Based on the smart contract, the first user and the second user are bound in a relationship corresponding to the binding tag. When the binding is successful, a record of binding relationship between the first user and the second user is generated, and the record of binding relationship is written into the blockchain. Therefore, in the embodiments of the specification, there is no human interference in the relationship binding process based on the smart contract in the blockchain, and moreover, the relationship binding process is visible to multiple parties based on the characteristics of the blockchain technology, which ensures authenticity and validity of the bound relationship. In addition, the immutability, openness, and searchability of the data on the chain are ensured, which effectively avoids problems such as data loss, data fraud, data island, etc.

Figure 6:
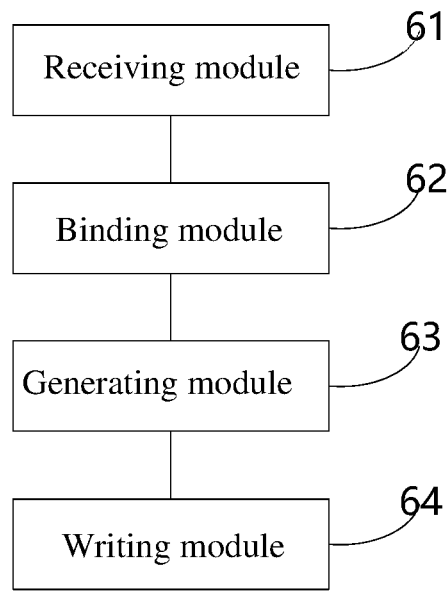
FIG. 6 is a schematic diagram of a module composition of a blockchain-based relationship binding apparatus according to one or more embodiments of the specification.

Corresponding to the above-described blockchain-based relationship binding method according to FIG. 2 to FIG. 5, one or more embodiments of the specification further provide, based on the same technical concept, a blockchain-based relationship binding apparatus. FIG. 6 is a schematic diagram of a module composition of the blockchain-based relationship binding apparatus according to one or more embodiments of the specification. The apparatus is configured to implement the blockchain-based relationship binding method described in FIG. 2 to FIG. 5, and as shown in FIG. 6, the apparatus comprises:

a receiving module 61 configured to receive a user binding request sent by a first user, wherein the user binding request comprises user information of a second user to be bound with the first user and a binding tag of a to-be-bound relationship between the first user and the second user;

a binding module 62 configured to invoke a smart contract in a blockchain, and bind, based on the smart contract, the first user and the second user in a relationship corresponding to the binding tag;

a generating module 63 configured to generate, if the binding is successful, a record of binding relationship between the first user and the second user according to the user information;

and a writing module 64 configured to write the record of binding relationship into the blockchain.

In one or more embodiments of the specification, there is no human interference in the relationship binding process based on the smart contract in the blockchain, and moreover, the relationship binding process is visible to multiple parties based on the characteristics of the blockchain technology, which ensures authenticity and validity of the bound relationship. In addition, the immutability, openness, and searchability of the data on the chain are ensured, which effectively avoids problems such as data loss, data fraud, data island, etc.

In some embodiments, the binding module 62 is configured, for example, to:

determine, based on the smart contract, whether the first user and the second user meet a binding condition; and if yes, bind the first user and the second user in a relationship corresponding to the binding tag.

In some embodiments, the binding module 62 is further configured, for example, to:

if it is determined, based on the smart contract, that the user information of the second user is valid, and confirmation response data sent by the second user is obtained, then determine that the first user and the second user meet the binding condition.

In some embodiments, the binding tag is a binding tag of a one-to-one binding relationship, and correspondingly, the binding module 62 is further configured, for example, to:

if it is determined, based on the smart contract, that the second user is not bound with any user in a relationship corresponding to the binding tag, then determine that the first user and the second user meet the binding condition; or In some embodiments, the binding tag is a binding tag of a one-to-many binding relationship, and correspondingly, the binding module 62 is further configured, for example, to:

if it is determined, based on the smart contract, that the second user has a first identity in a relationship corresponding to the binding tag and it is determined that the second user is not bound with any user in the relationship corresponding to the binding tag, then determine that the first user and the second user meet the binding condition.

In some embodiments, the binding module 62 is further configured, for example, to:

according to the binding tag and user information of the first user, send a binding relationship confirmation request to the second user, and obtain the confirmation response data sent by the second user; alternatively, the binding request further comprising message information, and the binding module 62 is further configured, for example, to:

according to the message information, the binding tag, and user information of the first user, send a binding relationship confirmation request to the second user, and obtain the confirmation response data sent by the second user.

In some embodiments, the generating module 64 is configured, for example, to:

associate and record the user information of the first user, the user information of the second user, and the binding tag, and use the recorded information as a record of binding relationship between the first user and the second user.

In some embodiments, the apparatus further comprises a storing module configured to:

after the binding by the binding module 62, based on the smart contract, the first user and the second user in a relationship corresponding to the binding tag, store the binding tag into a local database.

The blockchain-based relationship binding apparatus provided in one or more embodiments of the specification may receive a user binding request sent by a first user, wherein the binding request comprises user information of a second user to be bound with the first user and a binding tag of a to-be-bound relationship between the first user and the second user, invoke a smart contract in a blockchain, and based on the smart contract, bind the first user and the second user in a relationship corresponding to the binding tag. When the binding is successful, the blockchain-based relationship binding apparatus may generate a record of binding relationship between the first user and the second user according to the user information of the second user, and write the record of binding relationship into the blockchain. Therefore, based on the smart contract in the blockchain, there is no human interference in the relationship binding process, and moreover, the relationship binding process is visible to multiple parties based on the characteristics of the blockchain technology, which ensures authenticity and validity of the bound relationship. In addition, the immutability, openness, and searchability of the data on the chain are ensured, which effectively avoids problems such as data loss, data fraud, data island, etc.

It should be noted that the embodiments of the blockchain-based relationship binding apparatus in the present application and the embodiments of the blockchain-based relationship binding method in the present application are based on the same invention concept. Therefore, with regard to detailed implementations of the embodiments of the blockchain-based relationship binding apparatus, reference may be made to the above-described corresponding implementations of the blockchain-based relationship binding method, and the repeated parts are not elaborated here.

Figure 7:
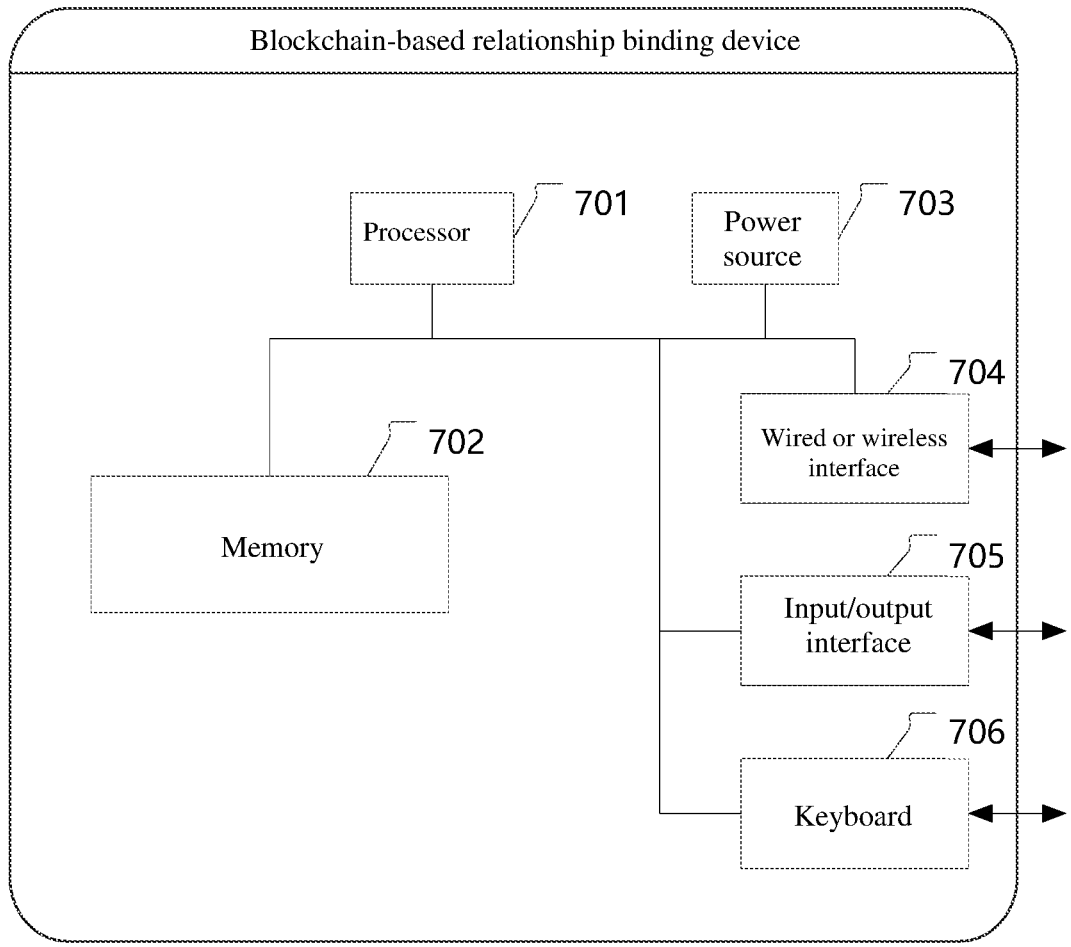
FIG. 7 is a schematic structural diagram of a blockchain-based relationship binding device according to one or more embodiments of the specification.

Furthermore, corresponding to the above-described method shown in FIG. 2 to FIG. 5, one or more embodiments of the specification further provide, based on the same technical concept, a blockchain-based relationship binding device. The device is configured to implement the above-described blockchain-based relationship binding method, as shown in FIG. 7.

The blockchain-based relationship binding device may vary significantly due to different configurations or performance, and may comprise one or more processors 701 and memories 702. The memory 702 may store one or more stored applications or data, wherein the memory 702 may achieve transient storage or persistent storage. An application stored in the memory 702 may comprise one or more modules (not shown), and each module may comprise information of a series of computer executable instructions in the blockchain-based relationship binding device. Furthermore, the processor 701 may be configured to communicate with the memory 702 and execute the series of computer executable instructions in the memory 702 on the blockchain-based relationship binding device. The blockchain-based relationship binding device may further comprise one or more power sources 703, one or more wired or wireless network interfaces 704, one or more input/output interfaces 705, one or more keyboards 706, etc.

In an exemplary embodiment, the blockchain-based relationship binding device comprises a memory and one or more programs, wherein the one or more programs are stored in the memory, the one or more programs may comprise one or more modules, and each module may comprise a series of computer executable instructions in the blockchain-based relationship binding device and may be configured to execute, by one or more processors, the one or more programs, comprising performing the following computer executable instructions:

receiving a user binding request sent by a first user, wherein the user binding request comprises user information of a second user to be bound with the first user and a binding tag of a to-be-bound relationship between the first user and the second user;

invoking a smart contract in a blockchain, and binding, based on the smart contract, the first user and the second user in a relationship corresponding to the binding tag;

generating, if the binding is successful, a record of binding relationship between the first user and the second user according to the user information; and writing the record of binding relationship into the blockchain.

In one or more embodiments of the specification, there is no human interference in the relationship binding process based on the smart contract in the blockchain, and moreover, the relationship binding process is visible to multiple parties based on the characteristics of the blockchain technology, which ensures authenticity and validity of the bound relationship. In addition, the immutability, openness, and searchability of the data on the chain are ensured, which effectively avoids problems such as data loss, data fraud, data island, etc.

In some embodiments, when the computer executable instructions are executed, the binding, based on the smart contract, the first user and the second user in a relationship corresponding to the binding tag comprises:

determining, based on the smart contract, whether the first user and the second user meet a binding condition; and if yes, binding the first user and the second user in a relationship corresponding to the binding tag.

In some embodiments, when the computer executable instructions are executed, the determining, based on the smart contract, whether the first user and the second user meet a binding condition comprises:

if it is determined, based on the smart contract, that the user information of the second user is valid, and confirmation response data sent by the second user is obtained, then determining that the first user and the second user meet the binding condition.

In some embodiments, when the computer executable instructions are executed, the binding tag is a binding tag of a one-to-one binding relationship, and the determining, based on the smart contract, whether the first user and the second user meet a binding condition further comprises:

if it is determined, based on the smart contract, that the second user is not bound with any user in a relationship corresponding to the binding tag, then determining that the first user and the second user meet the binding condition; or the binding tag is a binding tag of a one-to-many binding relationship, and the determining, based on the smart contract, whether the first user and the second user meet a binding condition further comprises:

if it is determined, based on the smart contract, that the second user has a first identity in a relationship corresponding to the binding tag and it is determined that the second user is not bound with any user in the relationship corresponding to the binding tag, then determining that the first user and the second user meet the binding condition.

In some embodiments, when the computer executable instructions are executed, the method further comprises:

according to the binding tag and user information of the first user, sending a binding relationship confirmation request to the second user, and obtaining the confirmation response data sent by the second user; alternatively, the binding request further comprising message information, and the method further comprising:

according to the message information, the binding tag, and user information of the first user, sending a binding relationship confirmation request to the second user, and obtaining the confirmation response data sent by the second user.

In some embodiments, when the computer executable instructions are executed, the generating a record of binding relationship between the first user and the second user according to the user information comprises:

associating and recording the user information of the first user, the user information of the second user, and the binding tag, and using the recorded information as a record of binding relationship between the first user and the second user.

In some embodiments, when the computer executable instructions are executed, after the binding, based on the smart contract, the first user and the second user in a relationship corresponding to the binding tag, the method further comprises:

storing the binding tag into a local database.

The blockchain-based relationship binding device provided in one or more embodiments of the specification may receive a user binding request sent by a first user, wherein the user binding request comprises user information of a second user to be bound with the first user and a binding tag of a to-be-bound relationship between the first user and the second user, invoke a smart contract in a blockchain, and based on the smart contract, bind the first user and the second user in a relationship corresponding to the binding tag. When the binding is successful, the blockchain-based relationship binding device may generate a record of binding relationship between the first user and the second user according to the user information of the second user, and write the record of binding relationship into the blockchain. Therefore, based on the smart contract in the blockchain, there is no human interference in the relationship binding process, and moreover, the relationship binding process is visible to multiple parties based on the characteristics of the blockchain technology, which ensures authenticity and validity of the bound relationship. In addition, the immutability, openness, and searchability of the data on the chain are ensured, which effectively avoids problems such as data loss, data fraud, data island, etc.

It should be noted that the embodiments of the blockchain-based relationship binding device in the specification and the embodiments of the blockchain-based relationship binding method in the specification are based on the same invention concept. Therefore, with regard to detailed implementations of the embodiments of the blockchain-based relationship binding device, reference may be made to the above-described corresponding implementations of the blockchain-based relationship binding method, and the repeated parts are not elaborated here.

Furthermore, corresponding to the above-described method shown in FIG. 2 to FIG. 5, one or more embodiments of the specification further provide, based on the same technical concept, a storage medium configured to store a computer executable instruction. In an exemplary embodiment, the storage medium may be a USB flash drive, a CD, a hard drive, and the like. The computer executable instruction stored in the storage medium may, when being executed by a processor, implement the following process of:

receiving a user binding request sent by a first user, wherein the user binding request comprises user information of a second user to be bound with the first user and a binding tag of a to-be-bound relationship between the first user and the second user;

invoking a smart contract in a blockchain, and binding, based on the smart contract, the first user and the second user in a relationship corresponding to the binding tag;

generating, if the binding is successful, a record of binding relationship between the first user and the second user according to the user information; and writing the record of binding relationship into the blockchain.

In one or more embodiments of the specification, there is no human interference in the relationship binding process based on the smart contract in the blockchain, and moreover, the relationship binding process is visible to multiple parties based on the characteristics of the blockchain technology, which ensures authenticity and validity of the bound relationship. In addition, the immutability, openness, and searchability of the data on the chain are ensured, which effectively avoids problems such as data loss, data fraud, data island, etc.

In some embodiments, when the computer executable instruction stored in the storage medium is executed by a processor, the binding, based on the smart contract, the first user and the second user in a relationship corresponding to the binding tag comprises:

determining, based on the smart contract, whether the first user and the second user meet a binding condition; and if yes, binding the first user and the second user in a relationship corresponding to the binding tag.

In some embodiments, when the computer executable instruction stored in the storage medium is executed by a processor, the determining, based on the smart contract, whether the first user and the second user meet a binding condition comprises:

if it is determined, based on the smart contract, that the user information of the second user is valid, and confirmation response data sent by the second user is obtained, then determining that the first user and the second user meet the binding condition.

In some embodiments, when the computer executable instruction stored in the storage medium is executed by a processor, the binding tag is a binding tag of a one-to-one binding relationship, and the determining, based on the smart contract, whether the first user and the second user meet a binding condition further comprises:

if it is determined, based on the smart contract, that the second user is not bound with any user in a relationship corresponding to the binding tag, then determining that the first user and the second user meet the binding condition; or the binding tag is a binding tag of a one-to-many binding relationship, and the determining, based on the smart contract, whether the first user and the second user meet a binding condition further comprises:

if it is determined, based on the smart contract, that the second user has a first identity in a relationship corresponding to the binding tag and it is determined that the second user is not bound with any user in the relationship corresponding to the binding tag, then determining that the first user and the second user meet the binding condition.

In some embodiments, when the computer executable instruction stored in the storage medium is executed by a processor, the method further comprises:

according to the binding tag and user information of the first user, sending a binding relationship confirmation request to the second user, and obtaining the confirmation response data sent by the second user; alternatively, the binding request further comprising message information, and the method further comprising:

according to the message information, the binding tag, and user information of the first user, sending a binding relationship confirmation request to the second user, and obtaining the confirmation response data sent by the second user.

In some embodiments, when the computer executable instruction stored in the storage medium is executed by a processor, the generating a record of binding relationship between the first user and the second user according to the user information comprises:

associating and recording the user information of the first user, the user information of the second user, and the binding tag, and using the recorded information as a record of binding relationship between the first user and the second user.

In some embodiments, when the computer executable instruction stored in the storage medium is executed by a processor, after the binding, based on the smart contract, the first user and the second user in a relationship corresponding to the binding tag, the method further comprises:

storing the binding tag into a local database.

When the computer executable instruction stored in the storage medium provided in one or more embodiments of the specification is executed by a processor, a user binding request sent by a first user is received, wherein the user binding request comprises user information of a second user to be bound with the first user and a binding tag of a to-be-bound relationship between the first user and the second user, a smart contract in a blockchain is invoked, and based on the smart contract, the first user and the second user are bound in a relationship corresponding to the binding tag. When the binding is successful, a record of binding relationship between the first user and the second user is generated according to the user information of the second user, and the record of binding relationship is written into the blockchain. Therefore, based on the smart contract in the blockchain, there is no human interference in the relationship binding process, and moreover, the relationship binding process is visible to multiple parties based on the characteristics of the blockchain technology, which ensures authenticity and validity of the bound relationship. In addition, the immutability, openness, and searchability of the data on the chain are ensured, which effectively avoids problems such as data loss, data fraud, data island, etc.

It should be noted that the embodiments of the storage medium in the present application and the embodiments of the blockchain-based relationship binding method in the present application are based on the same invention concept. Therefore, with regard to detailed implementations of the embodiments of the storage medium, reference may be made to the above-described corresponding implementations of the blockchain-based relationship binding method, and the repeated parts are not elaborated here.

In the 1990s, an improvement to a technology can be obviously differentiated into a hardware improvement (e.g., an improvement to a circuit structure, such as a diode, a transistor, a switch, etc.) or a software improvement (an improvement to a flow of a method). With the technological development, however, many current improvements to method flows may be deemed as direct improvements to hardware circuit structures. Designers almost always obtain a corresponding hardware circuit structure by programming an improved method flow into a hardware circuit. Therefore, it cannot be concluded that an improvement to a method flow cannot be realized with a hardware module. For example, Programmable Logic Device (PLD) (e.g., Field Programmable Gate Array (FPGA)) is such integrated circuit of which logic functions are determined by a user through programming the device. A designer programs on his/her own to "integrate" a digital system onto one piece of PLD, who does not need to request a chip manufacturer to design and manufacture a dedicated IC chip. At present, moreover, this type of programming has mostly been implemented through "logic compiler" software, rather than manually manufacturing the IC chips. The logic compiler software is similar to a software compiler used for program development and writing, while a particular programming language must be used for writing source codes prior to compiling, which is referred to as a Hardware Description Language (HDL). There is not just one, but many types of HDL, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), etc. The most commonly used right now includes VHDL (Very-High-Speed Integrated Circuit Hardware Description Language) and Verilog. One of ordinary skill in the art should also be aware that it would be very easy to obtain a hardware circuit to implement a logic method flow by using the above HDLs to carry out a little bit logic programming on the method flow and program the method flow into an IC.

A controller may be implemented in any proper manner. For example, a controller may be in, for example, a form of a microprocessor or processor, as well as a computer readable medium that stores computer readable program codes (e.g., software or firmware) executable by the (micro) processor, a logic gate, a switch, an Application Specific Integrated Circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. A memory controller may further be implemented as a part of control logic of a memory. One of ordinary skill in the art should also be aware that, in addition to that a controller is implemented in a manner of pure computer readable program codes, it is totally feasible to perform logic programming on steps of a method to enable a controller to implement the same functions in a form of a logic gate, a switch, an ASIC, a programmable logic controller, an embedded microcontroller, etc. Therefore, such controller may be deemed as a hardware part, while devices comprised in the controller and configured to achieve various functions may also be deemed as a structure inside the hardware part. Alternatively, devices configured to achieve various functions may even be deemed as both software modules to implement a method and a structure inside a hardware part.

The system, apparatus, module, or unit described in the above embodiments may be implemented, for example, by a computer chip or entity, or implemented by a product having a function. A typical implementation device is a computer. In one example, a computer may be, for example, a personal computer, a laptop computer, a cellular phone, a camera phone, a smart phone, a personal digital assistant, a medium player, a navigation device, an email device, a game console, a tablet computer, a wearable device, or a combination of any of these devices.

For convenience of description, the above apparatus is divided into various units according to functions for description. Functions of the units may be implemented in one or more pieces of software and/or hardware when the present application is implemented.

One of ordinary skill in the art should understand that the embodiments of the present application may be provided as a method, a system, or a computer program product. Therefore, the present application may be implemented as a complete hardware embodiment, a complete software embodiment, or an embodiment combing software and hardware. Moreover, the present application may be in the form of a computer program product implemented on one or more computer usable storage media (including, but not limited to, a magnetic disk memory, CD-ROM, an optical memory, etc.) comprising computer usable program codes.

The present application is described with reference to flowcharts and/or block diagrams of the method, device (system), and computer program product according to the embodiments of the present application. It should be understood that computer program instructions may be used to implement each process and/or block in the flowcharts and/or block diagrams and a combination of processes and/or blocks in the flowcharts and/or block diagrams. These computer program instructions may be provided for a general-purpose computer, a special-purpose computer, an embedded processor, or a processor of other programmable data processing devices to generate a machine, causing instructions executed by a computer or a processor of other programmable data processing devices to generate an apparatus for implementing a function specified in one or more processes in the flowcharts and/or in one or more blocks in the block diagrams.

These computer program instructions may also be stored in a computer readable memory that can instruct a computer or other programmable data processing devices to work in a particular manner, causing the instructions stored in the computer readable memory to generate a manufactured article that includes an instruction apparatus. The instruction apparatus implements a function specified in one or more processes in the flowcharts and/or in one or more blocks in the block diagrams.

These computer program instructions may also be loaded onto a computer or other programmable data processing devices, causing a series of operational steps to be performed on the computer or other programmable devices, thereby generating computer-implemented processing. Therefore, the instructions executed on the computer or other programmable devices provide steps for implementing a function specified in one or more processes in the flowcharts and/or in one or more blocks in the block diagrams.

In a typical configuration, a computation device includes one or more processors (CPUs), input/output interfaces, network interfaces, and a memory.

The memory may include computer readable media, such as a volatile memory, a Random Access Memory (RAM), and/or a non-volatile memory, e.g., a Read Only Memory (ROM) or a flash RAM. The memory is an example of a computer readable medium.

Computer readable media include permanent, volatile, mobile, and immobile media, which can implement information storage through any method or technology. The information may be computer readable instructions, data structures, program modules, or other data. Examples of storage media of computers include, but are not limited to, Phase-change Random Access Memories (PRAMs), Static Random Access Memories (SRAMs), Dynamic Random Access Memories (DRAMs), other types of Random Access Memories (RAMs), Read Only Memories (ROMs), Electrically Erasable Programmable Read-Only Memories (EEPROMs), flash memories or other memory technologies, Compact Disk Read-Only Memories (CD-ROMs), Digital Versatile Discs (DVDs) or other optical memories, magnetic cassettes, cassette and disk memories or other magnetic memory devices, or any other non-transmission media, which can be used for storing information accessible to a computation device. According to the definitions in the specification, the computer readable media do not include transitory media, such as modulated data signals and carriers.

It should be further noted that the terms of "including," "comprising" or any other variants of the terms are intended to encompass a non-exclusive inclusion, causing a process, method, product, or device comprising a series of elements to not only comprise these elements, but also comprise other elements that are not clearly listed, or further comprise elements that are inherent to the process, method, product, or device. When there is no further restriction, elements defined by the statement "comprising one . . . " does not exclude that a process, method, product, or device comprising the above elements further comprises additional identical elements.

One of ordinary skill in the art should understand that the embodiments of the present application may be provided as a method, a system, or a computer program product. Therefore, the present application may be implemented as a complete hardware embodiment, a complete software embodiment, or an embodiment combing software and hardware. Moreover, the present application may be in the form of a computer program product implemented on one or more computer usable storage media (including, but not limited to, a magnetic disk memory, CD-ROM, an optical memory, etc.) comprising computer usable program codes.

The present application may be described in a regular context of a computer executable instruction that is executed by a computer, such as a program module. Generally, the program module comprises a routine, a program, an object, a component, a data structure, etc. for executing a particular task or implementing a particular abstract data type. The present application may also be practiced in distributed computing environments. In these distributed computing environments, remote processing devices connected via communication networks carry out tasks. In the distributed computing environments, a program module may be located in local and remote computer storage media, including storage devices.

The embodiments in the specification are described in a progressive manner with each embodiment focused on differences from other embodiments, and the embodiments may be mutually referenced for identical or similar parts. In particular, the system embodiment is described in a relatively simple manner, as the system embodiment is substantially similar to the method embodiment. The description of the method embodiment may be referenced for related parts.

The above-described is only embodiments of the present application, which are not used to limit the present application. To one of ordinary skill in the art, the present application may have various modifications and changes. Any modification, equivalent substitution, or improvement made within the spirit and principle of the present application shall be encompassed by the claims of the present application.

The invention claimed is:

1. A blockchain-based user binding method, comprising:
   receiving, by a blockchain node of a blockchain, a user binding request from a computing device of a first user, wherein the user binding request comprises user information of the first user, user information of a second user to be bound with the first user, and a binding tag, the binding tag comprising (1) a binding type of a binding relationship, and (2) role information of the second user in the binding relationship;
   retrieving, by the blockchain node, information of a user terminal of the second user based on a mapping between the user information of the second user and the user terminal;
   sending, by the blockchain node through a smart contract, a binding relationship confirmation request to the user terminal of the second user based on the information of the user terminal, the binding relationship confirmation request comprising the user information of the first user and the binding tag;
   in response to receiving a confirming response from the second user, retrieving, by the blockchain node, a relationship table of the second user from a local database of the blockchain node, wherein the relationship table of the second user comprises a primary dimension comprising the user information of the second user, a secondary dimension comprising user information of one or more users that have been bounded with the second user, a tertiary dimension comprising one or more binding types of one or more historical binding relationships between the second user and the one or more users, and a quaternary dimension comprising the role information of the second user in the one or more historical binding relationships;
   determining, by the blockchain node through the smart contract, attribute information of the binding type in the user binding request, wherein the smart contract stores a mapping relationship between the attribute information and the binding type;
   in response to the attribute information indicating that the binding type in the user binding request comprises a one-to-one binding relationship:
      determining whether the one or more binding types in the relationship table of the second user comprise the binding type in the user binding request, and
      if yes, sending binding failure information to the first user and terminating the method;
   in response to (1) the attribute information indicating that the binding type in the user binding request comprises a one-to-many binding relationship with a "one" aspect and a "many" aspect, and (2) the role information of the second user in the binding relationship corresponds to the "many" aspect of the one-to-many binding relationship:
      determining whether the relationship table of the second user comprises a record with (1) the binding type in the user binding request in the tertiary dimension, and (2) the role information of the second user in the quaternary dimension; and
      if yes, sending the binding failure information to the first user and terminating the method;
   generating, by the blockchain node, a record of binding relationship between the first user and the second user by associating the user information of the first user, the user information of the second user, and the binding tag;
   encrypting, by the blockchain node, the record of binding relationship into a ciphertext and storing the ciphertext on the blockchain, wherein the stored ciphertext is validated by a plurality of parties;
   updating, by the blockchain node, the relationship table of the second user in the local database according to the user binding request, and
   wherein one or more authorized users are allowed to query records of binding relationship stored on the blockchain.

2. The method according to claim 1, wherein the record of binding relationship further comprises a timestamp of a current time.

3. The method according to claim 1, further comprising:
   determining whether a response from the second user to the binding relationship confirmation request is received within a preset time window; and
   if not, sending the binding failure information to the first user.

4. The method according to claim 1, wherein the updating the relationship table of the second user in the local database according to the user binding request comprises:
   adding the user information of the first user to the secondary dimension of the relationship table, the binding type to the tertiary dimension.

5. The method according to claim 1, further comprising:
   updating, by the blockchain node, a relationship table of the first user in the local database according to the user binding request by adding the user information of the second user to the secondary dimension of the relationship table, the binding type to the tertiary dimension, and role information of the first user to the quaternary dimension.

6. A system comprising a processor of a blockchain node of a blockchain and a non-transitory computer-readable storage medium storing instructions executable by the processor of the blockchain node to cause the processor of the blockchain node to perform operations comprising:

receiving a user binding request from a computing device of a first user, wherein the user binding request comprises user information of the first user, user information of a second user to be bound with the first user, and a binding tag, the binding tag comprising (1) a binding type of a binding relationship, and (2) role information of the second user in the binding relationship;

retrieving information of a user terminal of the second user based on a mapping between the user information of the second user and the user terminal;

sending, through a smart contract, a binding relationship confirmation request to the user terminal of the second user based on the information of the user terminal, the binding relationship confirmation request comprising the user information of the first user and the binding tag;

in response to receiving a confirming response from the second user, retrieving a relationship table of the second user from a local database, wherein the relationship table of the second user comprises a primary dimension comprising the user information of the second user, a secondary dimension comprising user information of one or more users that have been bounded with the second user, a tertiary dimension comprising one or more binding types of one or more historical binding relationships between the second user and the one or more users, and a quaternary dimension comprising the role information of the second user in the one or more historical binding relationships;

determining, through the smart contract, attribute information of the binding type in the user binding request, wherein the smart contract stores a mapping relationship between the attribute information and the binding type;

in response to the attribute information indicating that the binding type in the user binding request comprises a one-to-one binding relationship:
  determining whether the one or more binding types in the relationship table of the second user comprise the binding type in the user binding request, and
  if yes, sending binding failure information to the first user and terminating the operations performed by the processor of the blockchain node;

in response to (1) the attribute information indicating that the binding type in the user binding request comprises a one-to-many binding relationship with a "one" aspect and a "many" aspect, and (2) the role information of the second user in the binding relationship corresponds to the "many" aspect of the one-to-many binding relationship:
  determining whether the relationship table of the second user comprises a record with (1) the binding type in the user binding request in the tertiary dimension, and (2) the role information of the second user in the quaternary dimension; and
  if yes, sending the binding failure information to the first user and terminating the operations performed by the processor of the blockchain node;

generating a record of binding relationship between the first and the second user by associating the user information of the first user, the user information of the second user, and the binding tag;

encrypting the record of binding relationship into a ciphertext and storing the ciphertext on the blockchain, wherein the stored ciphertext is validated by a plurality of parties; and updating the relationship table of the second user in the local database according to the user binding request, wherein one or more authorized users are allowed to query records of binding relationship stored on the blockchain.

7. The system according to claim 6, wherein the record of binding relationship further comprises a timestamp of a current time.

8. The system according to claim 6, wherein the operations further comprise:
  determining whether a response from the second user to the binding relationship confirmation request is received within a preset time window; and
  if not, sending the binding failure information to the first user.

9. The system according to claim 6, wherein the updating the relationship table of the second user in the local database according to the user binding request comprises:
  adding the user information of the first user to the secondary dimension of the relationship table, the binding type to the tertiary dimension.

10. The system according to claim 6, wherein the operations further comprise:
  updating a relationship table of the first user in the local database according to the user binding request by adding the user information of the second user to the secondary dimension of the relationship table, the binding type to the tertiary dimension, and role information of the first user to the quaternary dimension.

11. A non-transitory computer-readable storage medium configured with instructions executable by one or more processors of a blockchain node of a blockchain to cause the one or more processors of the blockchain node to perform operations comprising:

receiving a user binding request from a computing device of a first user, wherein the user binding request comprises user information of the first user, user information of a second user to be bound with the first user, and a binding tag, the binding tag comprising (1) a binding type of a binding relationship, and (2) role information of the second user in the binding relationship;

retrieving information of a user terminal of the second user based on a mapping between the user information of the second user and the user terminal;

sending, through a smart contract, a binding relationship confirmation request to the user terminal of the second user based on the information of the user terminal, the binding relationship confirmation request comprising the user information of the first user and the binding tag;

in response to receiving a confirming response from the second user, retrieving a relationship table of the second user from a local database, wherein the relationship table of the second user comprises a primary dimension comprising the user information of the second user, a secondary dimension comprising user information of one or more users that have been bounded with the second user, a tertiary dimension comprising one or more binding types of one or more historical binding relationships between the second user and the one or more users, and a quaternary dimension comprising the role information of the second user in the one or more historical binding relationships;

determining, through the smart contract, attribute information of the binding type in the user binding request, wherein the smart contract stores a mapping relationship between the attribute information and the binding type;

in response to the attribute information indicating that the binding type in the user binding request comprises a one-to-one binding relationship:
 determining whether the one or more binding types in the relationship table of the second user comprise the binding type in the user binding request, and
 if yes, sending binding failure information to the first user and terminating the operations performed by the one or more processors of the blockchain node;

in response to (1) the attribute information indicating that the binding type in the user binding request comprises a one-to-many binding relationship with a "one" aspect and a "many" aspect, and (2) the role information of the second user in the binding relationship corresponds to the "many" aspect of the one-to-many binding relationship:
 determining whether the relationship table of the second user comprises a record with (1) the binding type in the user binding request in the tertiary dimension, and (2) the role information of the second user in the quaternary dimension; and
 if yes, sending the binding failure information to the first user and terminating the operations performed by the one or more processors of the blockchain node;

generating a record of binding relationship between the first user and the second user by associating the user information of the first user, the user information of the second user, and the binding tag;

encrypting the record of binding relationship into a ciphertext and storing the ciphertext on the blockchain, wherein the stored ciphertext is validated by a plurality of parties; and updating the relationship table of the second user in the local database according to the user binding request, wherein one or more authorized users are allowed to query records of binding relationship stored on the blockchain.

12. The storage medium according to claim 11, wherein the record of binding relationship further comprises a timestamp of a current time.

13. The storage medium according to claim 11, wherein the operations further comprise:
 determining whether a response from the second user to the binding relationship confirmation request is received within a preset time window; and
 if not, sending the binding failure information to the first user.

14. The storage medium according to claim 11, wherein the updating the relationship table of the second user in the local database according to the user binding request comprises:
 adding the user information of the first user to the secondary dimension of the relationship table, the binding type to the tertiary dimension.

15. The storage medium according to claim 11, wherein the operations further comprise:
 updating a relationship table of the first user in the local database according to the user binding request by adding the user information of the second user to the secondary dimension of the relationship table, the binding type to the tertiary dimension, and role information of the first user to the quaternary dimension.

* * * * *